US006809723B2

(12) United States Patent
Davis

(10) Patent No.: US 6,809,723 B2
(45) Date of Patent: Oct. 26, 2004

(54) PUSHBUTTON OPTICAL SCREEN POINTING DEVICE

(75) Inventor: Jeffery Davis, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 245 days.

(21) Appl. No.: 09/855,013

(22) Filed: May 14, 2001

(65) Prior Publication Data

US 2002/0167489 A1 Nov. 14, 2002

(51) Int. Cl.$^7$ ................................................. G09G 5/08
(52) U.S. Cl. ...................... 345/166; 345/160; 345/165
(58) Field of Search ........................ 345/163, 165–166, 345/169, 175, 160, 161

(56) References Cited

U.S. PATENT DOCUMENTS

| | | | |
|---|---|---|---|
| 5,578,813 A | | 11/1996 | Allen et al. |
| 5,644,139 A | | 7/1997 | Allen et al. |
| 5,786,804 A | | 7/1998 | Gordon |
| 5,994,710 A | | 11/1999 | Knee et al. |
| 6,005,490 A | * | 12/1999 | Higashihara ............ 340/825.72 |
| 6,057,540 A | | 5/2000 | Gordon et al. |
| 6,151,015 A | | 11/2000 | Badyal et al. |
| 6,336,727 B1 | * | 1/2002 | Kim ............................. 362/23 |
| 6,670,946 B2 | * | 12/2003 | Endo et al. .................. 345/160 |
| 2002/0030668 A1 | | 3/2002 | Hoshino et al. |
| 2002/0130839 A1 | * | 9/2002 | Wallace et al. .............. 345/157 |
| 2002/0135565 A1 | * | 9/2002 | Gordon et al. ............... 345/169 |
| 2003/0006965 A1 | * | 1/2003 | Bohn .......................... 345/163 |

FOREIGN PATENT DOCUMENTS

JP        2001006509 A  *  1/2001  .......... H01H/43/02

OTHER PUBLICATIONS

"Seeing Eye" Mouse for a Computer System, U.S. patent application Ser. No. 09/052,046, filed Mar. 30, 1998.
Vince Lee, TEx Tennison, and Amanda Epume; TealDoc User's Manual, Program Version 3.03; Nov. 15, 1999.
Adobe Systems Incorporated; Adobe Acrobat Reader 4.0 Guide; 1999.
LandWare, Inc., TakeNote! DOC and Memo Text Processor for Palm Connected Organizers; 2000.
U.S. patent application Ser. No. 09/930,207, Hoshino et al., filed Mar. 14, 2002.

* cited by examiner

Primary Examiner—Kent Chang
Assistant Examiner—Tom Sheng

(57) ABSTRACT

An apparatus for controlling the position of a screen pointer for an electronic device having a display screen includes a pushbutton for selecting an item displayed on the display screen. The pushbutton includes an imaging surface against which a portion of the tip of a human digit may be placed. A light source illuminates that portion of the tip of the digit that is placed against the imaging surface, thereby generating reflected images. The apparatus includes a motion transducer. A lens receives the reflected images and directs the reflected images onto the motion transducer. The motion transducer generates digital representations of the reflected images. The motion transducer generates a first set of movement data based on the digital representations of the reflected images. The first set of movement data is indicative of motion of the tip of the digit across the imaging surface.

13 Claims, 4 Drawing Sheets

PUSHBUTTON OPTICAL SCREEN POINTING DEVICE

REFERENCE TO RELATED PATENTS

This application is related to the subject matter described in the following U.S. patents: U.S. Pat. No. 5,578,813, filed Mar. 2, 1995, issued Nov. 26, 1996, and entitled FREE-HAND IMAGE SCANNING DEVICE WHICH COMPENSATES FOR NON-LINEAR MOVEMENT; U.S. Pat. No. 5,644,139, filed Aug. 14, 1996, issued Jul. 1, 1997, and entitled NAVIGATION TECHNIQUE FOR DETECTING MOVEMENT OF NAVIGATION SENSORS RELATIVE TO AN OBJECT; and U.S. Pat. No. 5,786,804, filed Oct. 6, 1995, issued Jul. 28, 1998, and entitled METHOD AND SYSTEM FOR TRACKING ATTITUDE. These three patents describe techniques of tracking position movement. Those techniques are a component in a preferred embodiment described below. Accordingly, U.S. Pat. Nos. 5,578,813, 5,644,139, and 5,786,804 are hereby incorporated herein by reference.

This application is also related to the subject matter described in U.S. Pat. No. 6,057,540, filed Apr. 30, 1998, issued May 2, 2000, and entitled MOUSELESS OPTICAL AND POSITION TRANSLATION TYPE SCREEN POINTER CONTROL FOR A COMPUTER SYSTEM; U.S. Pat. No. 6,151,015, filed Apr. 27, 1998, issued Nov. 21, 2000, and entitled PEN LIKE COMPUTER POINTING DEVICE; and U.S. patent application Ser. No. 09/052,046, filed Mar. 30, 1998, entitled SEEING EYE MOUSE FOR A COMPUTER SYSTEM. These two related patents and patent application describe screen pointing devices based on the techniques described in U.S. Pat. Nos. 5,578,813, 5,644,139, and 5,786,804. Therefore, U.S. Pat. Nos. 6,057,540 and 6,151,015, and U.S. patent application Ser. No. 09/052,046, filed Mar. 30, 1998, entitled SEEING EYE MOUSE FOR A COMPUTER SYSTEM, are hereby incorporated herein by reference.

THE FIELD OF THE INVENTION

This invention relates generally to devices for controlling a cursor on a display screen, also known as pointing devices. This invention relates more particularly to a pushbutton optical pointing device.

BACKGROUND OF THE INVENTION

The use of a hand operated pointing device for use with a computer and its display has become almost universal. By far the most popular of the various devices is the conventional (mechanical) mouse, used in conjunction with a cooperating mouse pad. Centrally located within the bottom surface of the mouse is a hole through which a portion of the underside of a rubber-surfaced steel ball extends. The mouse pad is typically a closed cell foam rubber pad covered with a suitable fabric. Low friction pads on the bottom surface of the mouse slide easily over the fabric, but the rubber ball does not skid. Rather, the rubber ball rolls over the fabric as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a ΔX and a ΔY the displayed position of a pointer (cursor) in accordance with movement of the mouse. The user moves the mouse as necessary to get the displayed pointer to a desired location or position. Once the pointer on the screen points at an object or location of interest, a button on the mouse is activated with the fingers of the hand holding the mouse. The activation serves as an instruction to take some action, the nature of which is defined by software in the computer.

In addition to mechanical types of pointing devices like a conventional mouse, optical pointing devices have also been developed, such as those described in the incorporated patents and patent application. In one form of an optical pointing device, rather than using a moving mechanical element like a ball in a conventional mouse, relative movement between an imaging surface, such as a finger or a desktop, and photo detectors within the optical pointing device, is optically sensed and converted into movement information.

For portable electronic devices, such as cellular telephones, personal digital assistants (PDAs), digital cameras, portable game devices, pagers, portable music players (e.g., MP3 players), and other devices, it may be undesirable to use an external pointing device, such as a mechanical mouse or an optical mouse, coupled to the device. It is often inconvenient to carry around the additional equipment. And with a mechanical pointing device like a mouse, it may be difficult to find a suitable surface on which to operate the mouse.

Some portable electronic devices include built-in screen pointing devices. For example, some cellular telephones include arrow keys that allow a highlight bar to be moved around on a display screen to highlight menu items, such as names or telephone numbers. Once a menu item has been highlighted, the menu item is typically selected by pressing another key on the cellular telephone. Using multiple keys to highlight and select menu items is inefficient and time consuming, particularly for users who are more familiar with operating other types of screen pointing devices, such as a mouse or trackball, or an optical pointing device.

Some portable electronic devices also include indicators, such as blinking lights or audible indicators, to provide some type of notification to a user, such as a notification that the user has received an email message or voicemail message. For example, some telephones include a blinking light to notify the user that the user has received a voicemail message. Such indicators are typically provided by a standalone LED on the device, on a display screen of the device, or by an audio subsystem, and are not incorporated into a screen pointing device.

It would be desirable to provide an optical screen pointing device for use in a portable electronic device that combines screen pointer motion control, selection capabilities, and indication functions into a single compact device.

SUMMARY OF THE INVENTION

One form of the present invention provides an apparatus for controlling the position of a screen pointer for an electronic device having a display screen. The apparatus includes a pushbutton for selecting an item displayed on the display screen. The pushbutton includes an imaging surface against which a portion of the tip of a human digit may be placed. A light source illuminates that portion of the tip of the digit that is placed against the imaging surface, thereby generating reflected images. The apparatus includes a motion transducer. A lens receives the reflected images and directs the reflected images onto the motion transducer. The motion transducer generates digital representations of the reflected images. The motion transducer generates a first set of movement data based on the digital representations of the reflected images. The first set of movement data is indicative of motion of the tip of the digit across the imaging surface.

Another form of the present invention provides a method of controlling the position of a screen pointer for an electronic device having a display screen. A pushbutton for selecting an item displayed on the display screen is provided. A portion of an appendage of the human hand is placed against the pushbutton. A portion of the appendage that is against the pushbutton is illuminated. Images reflected from the portion of the appendage are focused onto an array of photo detectors. Output values of the photo detectors are digitized, thereby generating digital representations of the reflected images. At least one version of a first one of the digital representations is correlated with at least one version of a second one of the digital representations to generate a first set of motion data indicative of motion in orthogonal axes across the pushbutton by the appendage. The position of the screen pointer is adjusted in accordance with the first set of motion data.

Another form of the present invention provides a portable electronic device including a display screen for displaying a plurality of selectable items and a pointer movable by a user to identify particular ones of the selectable items. A motion sensing pushbutton senses movement across the pushbutton by an imaging surface. The pushbutton is configured to generate a first set of movement data indicating a first movement of the imaging surface across the pushbutton, and is configured to generate a selection signal when pushed by a user. A controller is configured to move the pointer based on the first set of movement data to identify a first selectable item. The controller is configured to select the first menu item based on the selection signal generated by the pushbutton.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
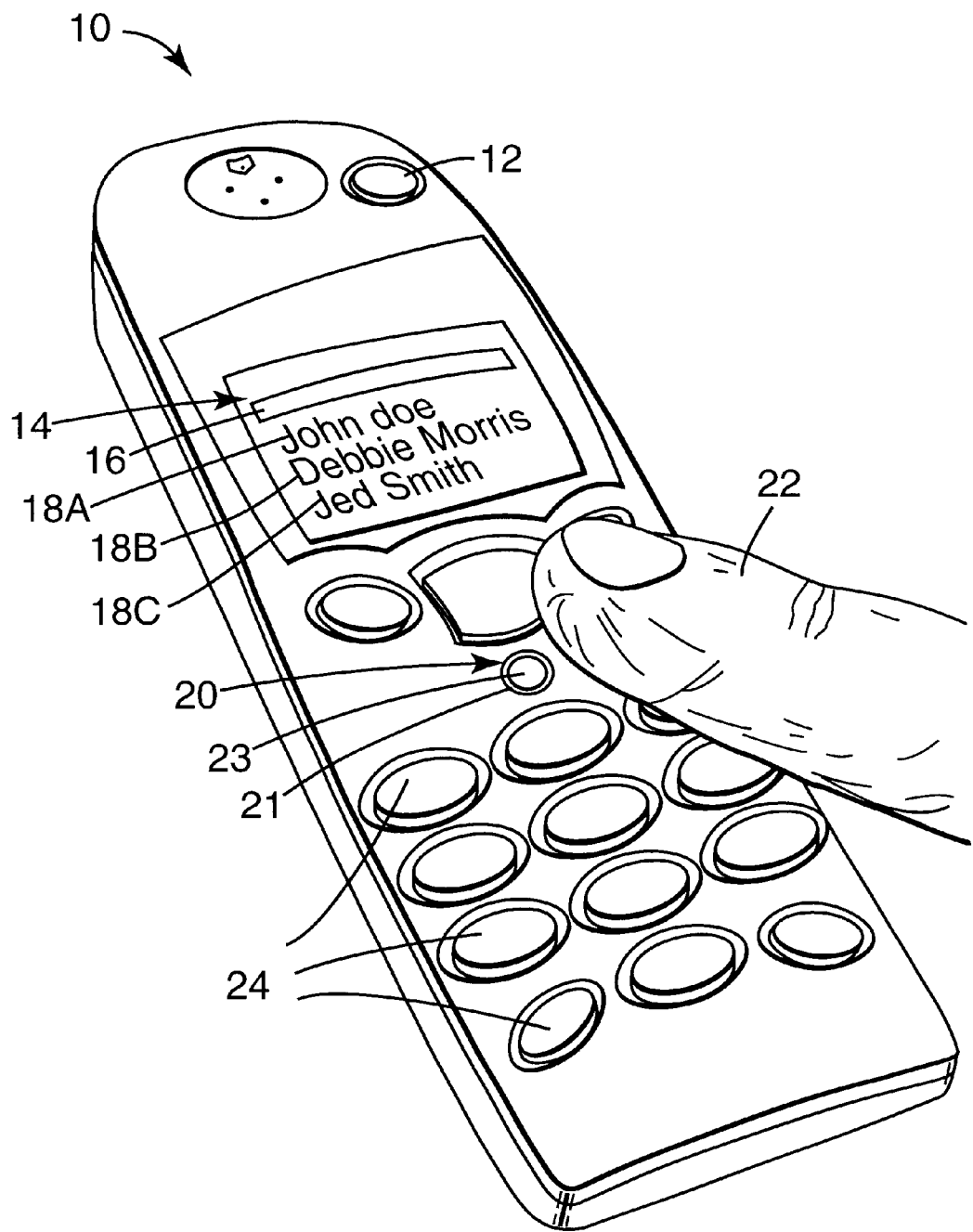
FIG. 1 is a perspective view of a cellular telephone with an optical, pushbutton screen pointer device according to one embodiment of the present invention.

FIG. 1 is a perspective view of a portable electronic device 10 with an optical, pushbutton screen pointer device 20 according to one embodiment of the present invention. In the embodiment shown in FIG. 1, portable electronic device 10 is a cellular telephone. In an alternative embodiment, device 10 may be any type of portable electronic device having a display screen, including a personal digital assistant (PDA), digital camera, portable game device, pager, portable music player, or other device.

Cellular telephone 10 includes power button 12, display screen 14, highlight bar 16, menu items 18A–18C (collectively referred to as menu 18), motion detection device 20, and a plurality of pushbuttons 24. Pushbuttons 24 are also referred to as keypad 24. Motion detection device 20 includes indicator ring 21 and pushbutton 23. A user turns cellular telephone 10 on/off using power button 12. A menu 18, including a plurality of menu items 18A–18C, is displayed to a user on display screen 14. In one embodiment, menu items 18A–18C are names or phone numbers. For menu items 18A–18C that are names, cellular telephone 10 stores an associated telephone number for each such name. Although one embodiment of the present invention is described in the context of a menu 18 and a highlight bar 16, alternative embodiments use other display arrangements, such as a movable screen pointer (e.g., an arrow) and selectable items (e.g., selectable icons) that are individually identified by placing the movable screen pointer over a desired item.

A user highlights a particular one of the menu items 18A–18C by moving highlight bar 16. In one embodiment, highlight bar 16 is moved by rubbing finger 22 against motion detection device 20, and more particularly against pushbutton 23. If finger 22 is moved upward against motion detection device 20, highlight bar 16 moves upward through menu items 18A–18C. If finger 22 is moved downward against motion detection device 20, highlight bar 16 moves downward through menu items 18A–18C. After a desired one of the menu items 18A–18C has been highlighted with highlight bar 16, the highlighted menu item is then selected. In one embodiment, a highlighted menu item is selected by pushing down on pushbutton 23 with finger 22. In one form of the invention, after a highlighted menu item has been selected by a user, cellular telephone 10 automatically dials the selected phone number, or the phone number associated with the selected name.

In addition to performing item selection, motion detection device 20 may be used to perform a variety of other functions, depending upon the particular type of portable electronic device that motion detection device 20 is used in. Such uses include, but are not limited to, moving a screen pointer around a display screen and selecting displayed items in virtually any type of device, causing a picture to be taken in a portable camera, and causing video and/or sound recording to begin in a recording device.

In one embodiment, pushbutton 23 lights up when touched by a user. In one form of the present invention, pushbutton 23 also lights up to provide some type of notification to a user, such as a notification that the user has received an email message or voicemail message, a notification of an incoming call, or other notification. In one embodiment, motion detection device 20 includes indicator ring 21, which surrounds pushbutton 23, and which also lights up to provide some type of notification to a user. Motion detection device 20 may be configured to provide a variety of different notifications with pushbutton 23 and indicator ring 21, by causing pushbutton 23 and/or indicator ring 21 to blink together or separately, to blink at different rates, or to emit different colors of visible light. In one embodiment, each type of visual indication provided by pushbutton 23 and indicator ring 21 correspond to a particular type of notification. For example, indicator ring 21 could blink two times in quick succession, pause for a brief period of time, and then blink two times in quick succession, and so on, to indicate that the user has 2 voicemail messages. Pushbutton 23 could blink in similar manner to indicate the number of received email messages.

Figure 2A:
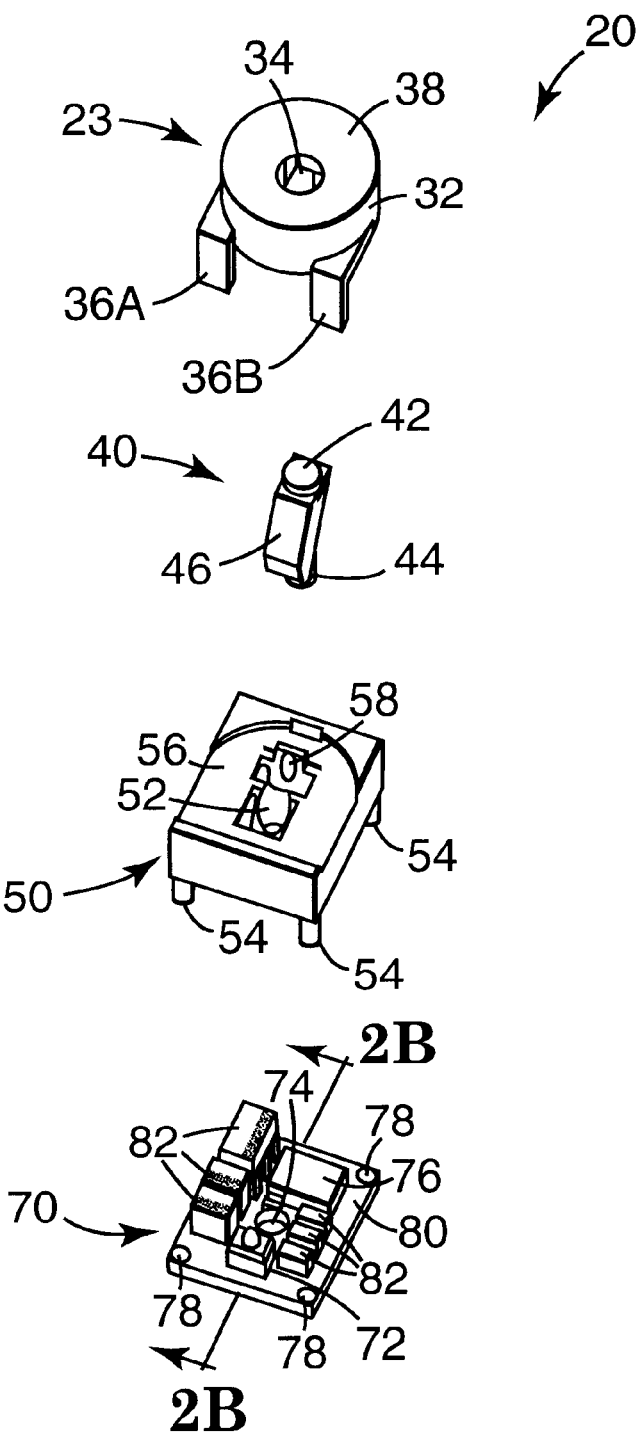
FIG. 2A is an exploded view illustrating the main components of one embodiment of an optical, pushbutton screen pointer device according to the present invention.

FIG. 2A is an exploded view illustrating the main components of one embodiment of a motion detection device 20 according to the present invention. Motion detection device 20 includes outer mechanical frame 23, lens assembly 40, internal mechanical frame 50, and circuit assembly 70. Outer mechanical frame 23 acts as a pushbutton as described in further detail below, and is also referred to as pushbutton 23. Outer mechanical frame 23 includes cylindrical frame 32 and fingers 36A and 36B. Fingers 36A–36B are attached to an outer surface of cylindrical frame 32 and extend generally downward. A top surface of cylindrical frame 32 is generally concave in shape, and is covered by top cover 38, as can be better seen in FIG. 2B. Hole 34 is formed in cylindrical frame 32 near the center of the frame.

Lens assembly 40 includes top portion 42, bottom portion 44, and middle portion 46. Top portion 42 of lens assembly 40 is generally circular in shape, and fits within hole 34 of cylindrical frame 32 when assembled. Middle portion 46 of lens assembly 40 is substantially hollow, and is angled with respect to bottom portion 44, as can be better seen in FIG. 2B. Bottom portion 44 of lens assembly 40 is generally cylindrical in shape.

Figure 2B:
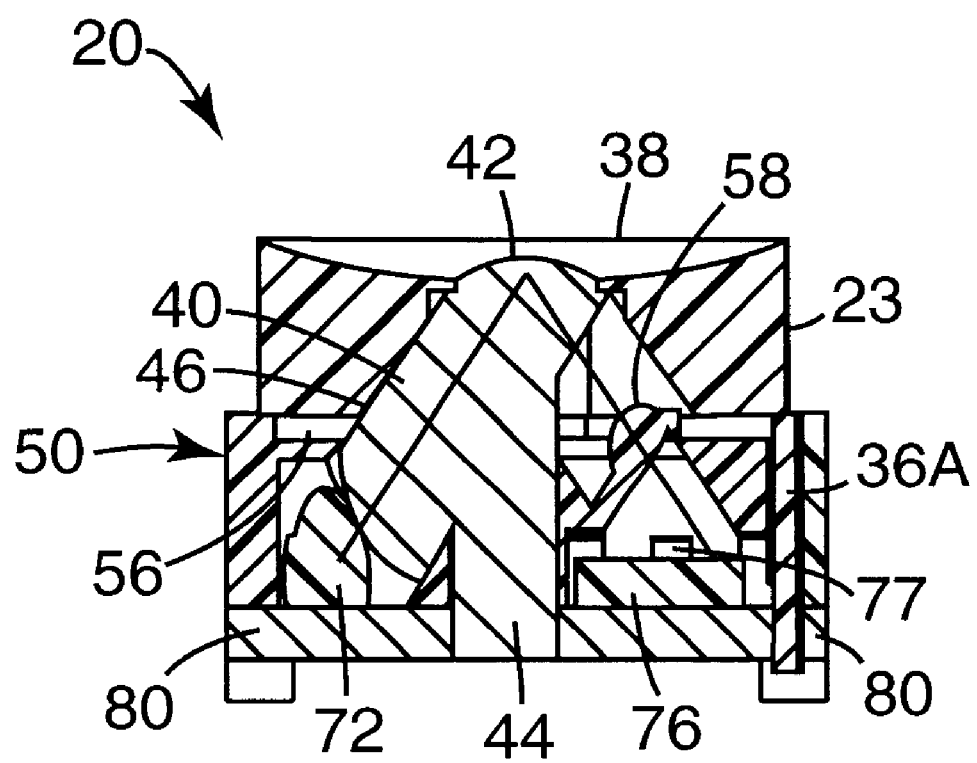
FIG. 2B is a cross-sectional view taken along section lines 2B—2B in FIG. 2A illustrating the screen pointer device shown in FIG. 2A after assembly.

Internal mechanical frame 50 includes opening 52, columns 54, recess 56, and lens 58. Recess 56 is formed on a top surface of internal mechanical frame 50, and is shaped to partially conform to an outer surface of cylindrical frame 32. Opening 52 is formed near the center of a top surface of internal mechanical frame 50, and is shaped to conform to an outer surface of lens assembly 40. When assembled, lens assembly 40 is positioned within opening 52, and outer mechanical frame 23 is positioned over recess 56, as shown in FIG. 2B. Lens 58 is positioned within opening 52 of internal mechanical frame 50. Four columns 54 are attached to a bottom surface of internal mechanical frame 50, and are used to attach internal mechanical frame 50 to circuit assembly 70.

Circuit assembly 70 includes light emitting diode (LED) 72, motion sensor 76, printed circuit board (PCB) 80, and support chips 82. LED 72, motion sensor 76, and support chips 82 are attached to PCB 80. Hole 74 is formed near the center of PCB 80, and is generally cylindrical in shape to conform to an outer surface of bottom portion 44 of lens assembly 40. Recesses 78 are formed near the corners of PCB 80, and are generally cylindrical in shape to conform to an outer surface of columns 54 of internal mechanical frame 50. When assembled, columns 54 of internal mechanical frame 50 are positioned within recesses 78 of circuit assembly 70, and bottom portion 44 of lens assembly 40 is positioned within hole 74, as shown in FIG. 2B.

Indicator ring 21 (shown in FIG. 1) is not shown in FIGS. 2A and 2B, but in one embodiment, is placed around the outer perimeter of cylindrical frame 32, and is electrically coupled to circuit assembly 70.

FIG. 2B is a cross-sectional view taken along section lines 2B—2B in FIG. 2A illustrating the motion detection device 20 shown in FIG. 2A after assembly. As shown in FIG. 2B, pushbutton 23 is rotated 180 degrees about its cylindrical axis from the position shown in FIG. 2A. Motion detection device 20 tracks the movement of a work surface or an imaging surface, such as human finger 22, which is pressed against top cover 38 of pushbutton 23.

LED 72 emits light that is gathered and focused by lens assembly 40 to illuminate top portion 42 of lens assembly 40 and top cover 38. Top cover 38 may be a glass or other wear resistant layer applied to the top of pushbutton 23. When the tip of finger 22 is pressed against surface 38, the ridges of skin and any other micro texture features are visible in the plane of surface 38, just as if they were a part of surface 38. Lens 58 focuses light from those features onto an array of photo detectors 77, which is part of movement sensor 76. Movement sensor 76 automatically acquires and tracks any suitable image. When tracking an image, movement sensor 76 produces incremental (X, Y) signals.

In one embodiment, in addition to illuminating an imaging or work surface, such as finger 22, for purposes of motion detection, LED 72 also emits visible light through surface 38 to provide a type of indication or notification to the user. In alternative embodiments, an additional LED or multiple LEDs, including different colored LEDs, are used to emit visible light through surface 38 to provide indications or notifications.

Lifting the fingertip away from surface 38 by even a few thousandths of an inch defocuses the image and produces a loss of tracking. This condition is detected within motion detector 76, and in one embodiment, the production of incremental (X, Y) signals ceases. This has the effect of leaving highlight bar 16 unchanged at whatever location it currently occupies, and is exactly the same as when a user of a mouse removes his hand from the mouse. When the fingertip is subsequently replaced on surface 38, motion detector 76 appreciates that an image has been acquired, and, in one embodiment, treats that acquisition as though a reset has been performed. That is, until there has been new motion subsequent to the new acquisition, the incremental coordinates (X, Y) will have the value (0, 0). This leaves the existing position of highlight bar 16 undisturbed until such time as it is deliberately moved by the motion of the fingertip, and corresponds exactly to a mouse user's placement of his hand back on the mouse without moving it.

Motion sensor 76 uses exactly or substantially the same technique as the imaging and navigation arrangement described in the incorporated Patents. In the particular operational settings described therein, it was desirable that there be some magnification of the image before it reached the sensor, because of the small size of the micro-features being imaged and tracked (e.g., paper fibers). Here, the features on the fingertip are really quite large in comparison, so that magnification is not used in one embodiment. Even though one form of an imaging and navigation mechanism is described in the incorporated Patents, a brief overview of the technique is provided below.

LED 72, which is an IR LED in one embodiment, emits light that is projected by lens assembly 40 onto a region 38 that is part of a work surface to be imaged for navigation. In one form of the present invention, motion sensor 76 is an integrated circuit (IC) having an array of photo detectors 77, memory, and arithmetic circuits arranged to implement image correlation and tracking functions described herein and in the incorporated patents. An image of the illuminated region, such as an image of the fingertip of finger 22, is projected through an optical window to a package of integrated circuit 76 and onto the array of photo detectors 77. Lens 58 aids in the projection of the image onto the photo detectors.

One preferred optical navigation technique according to the present invention optically detects motion by directly imaging as an array of pixels the various particular optical features visible at surface 38, much as human vision is believed to do. IR light reflected from a textured work surface pressed against surface 38 is focused onto a suitable array (e.g., 16×16 or 24×24) of photo detectors 77. The responses of the individual photo detectors are digitized to a suitable resolution (e.g., six or eight bits) and stored as a frame into corresponding locations within an array of memory. In one embodiment, each pixel in a frame corresponds to one of the photo detectors.

The overall size of the array of photo detectors 77 is preferably large enough to receive an image having several features (e.g., ridges in the whorls of skin). In this way, images of such spatial features produce translated patterns of pixel information as the fingertip moves. The number of photo detectors in the array and the frame rate at which their contents are digitized and captured cooperate to influence how fast the fingertip can be moved over surface 38 and still be tracked. Tracking is accomplished by comparing a newly captured sample frame with a previously captured reference frame to ascertain the direction and amount of movement.

In one embodiment, the entire content of one of the frames is shifted by a distance of one pixel successively in each of the eight directions allowed by a one pixel offset trial shift (one over, one over and one down, one down, one up, one up and one over, one over in the other direction, etc.). That adds up to eight trials. Also, since there might not have been any motion, a ninth trial "null shift" is also used. After each trial shift, those portions of the frames that overlap each other are subtracted on a pixel by pixel basis, and the resulting differences are preferably squared and then summed to form a measure of similarity (correlation) within that region of overlap. Larger trial shifts are possible, of course (e.g., two over and one down), but at some point the attendant complexity ruins the advantage, and it is preferable to simply have a sufficiently high frame rate with small trial shifts. The trial shift with the least difference (greatest correlation) can be taken as an indication of the motion between the two frames. That is, it provides raw movement information that may be scaled and or accumulated to provide highlight bar movement information (ΔX and ΔY) of a convenient granularity and at a suitable rate of information exchange.

Sensor 76 automatically detects when the fingertip has been removed from surface 38, by sensing that all or a majority of the pixels in the image have "gone dark." The process is actually somewhat more complicated than that, as explained below.

When the fingertip is removed from surface 38, the IR light from the illuminating LED 72 no longer reaches the photo detectors in the same quantity that it did previously, if at all; the reflecting surface is too far away or is simply not in view. However, if the fingertip is removed and the surface 38 is exposed to an intensely lit environment as a result, then the outputs of the photo detectors might be at any level. The key is that the outputs of the photo detectors will be uniform, or nearly so. The main reason that the outputs become uniform is that there is no longer a focused image. All of the image features are indistinct and they are each spread out over the entire collection of photo detectors. Therefore, the photo detectors uniformly come to some average level. This is in distinct contrast with the case when there is a focused image. In the focused case, the correlations between frames (recall the one over, one over and one down, etc.) exhibit a distinct phenomenon.

In operation, images should be acquired at a rate sufficient that successive images differ in distance by no more that perhaps a quarter of the width of the array, or 4 pixels for a 16×16 array of photo sensors. Experiments show that a finger speed of 50 mm/sec is not unreasonable. With 1:1 imaging, this corresponds to a speed at the array of 800 pixels per second. To meet a requirement of not moving more than four pixels per cycle, a measurement rate of 200 samples per second is needed. This rate is quite practical, and it may be desirable to operate at several times this rate.

As shown in FIG. 2B, pushbutton 23 is positioned over recess 56 of internal mechanical frame 50, and finger 36A of pushbutton 23 extends through PCB 80. In one embodiment, PCB 80 is attached to a main printed circuit board (not shown) of portable electronic device 10, and finger 36A is positioned over a button or dome on the main printed circuit board. Recess 56 allows pushbutton 23 to flex when pushed by a user, which causes finger 36A of pushbutton 23 to move downward through PCB 80 and actuate a button on the main printed circuit board.

Figure 3:
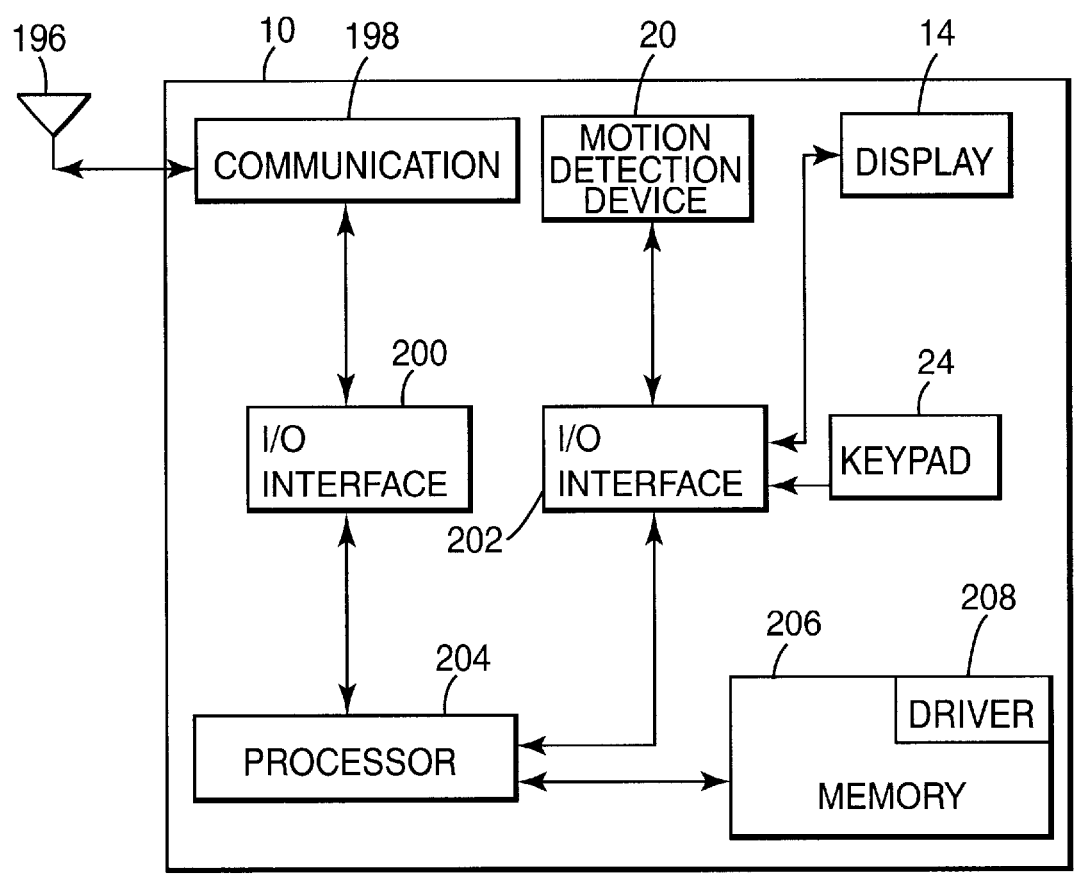
FIG. 3 is an electrical block diagram of major components of the cellular telephone shown in FIG. 1.

FIG. 3 is an electrical block diagram illustrating the major components of a portable electronic device 10, such as cellular telephone. Portable electronic device 10 includes antenna 196, communications circuitry 198, motion detection device 20, display 14, input/output (I/O) interface 200, I/O interface 202, keypad 24, processor 204, and memory 206. Motion detection device 20, display 14, and keypad 24 are each coupled to I/O interface 202. I/O interface 202 is also coupled to processor 204. Processor 204 communicates with motion detection device 20, display 14, and keypad 24, via I/O interface 202. Processor 204 is also coupled to memory 206. In one embodiment, driver 208 is stored in memory 206. Processor 204 uses driver 208 to control highlight bar 16 on display 14 based on movement data received from motion sensor 76 within motion detection device 20.

Communications are sent and received by device 10 via antenna 196. Antenna 196 is coupled to communications circuitry 198. Communications circuitry 198 includes standard communications components known to those of ordinary skill in the art, such as amplifiers, analog-to-digital converters, digital-to-analog converters, modulators, and demodulators. Processor 204 is coupled to communications circuitry 198 via I/O interface 200.

In one form of the present invention, processor 204 receives incremental (X, Y) signals from motion sensor 76 within motion detection device 20, indicating relative movement between motion detection device 20 and a work surface. Processor 204 also receives selection signals from motion detection device 20, indicating that a user has pushed pushbutton 23. Using driver 208, processor 204 processes the received incremental (X, Y) signals and selection signals, and takes appropriate action. For example, if finger 22 is moved upward against motion detection device 20, processor 204 receives incremental (X, Y) signals from motion sensor 76 indicative of this upward movement. In response, processor 204 causes highlight bar 16 on display 14 to move upward through menu items 18A–18C. If finger 22 is moved downward against motion detection device 20, processor 204 receives incremental (X, Y) signals from motion sensor 76 indicative of this downward movement. In response, processor 204 causes highlight bar 16 on display 14 to move downward through menu items 18A–18C. If the received selection signals from motion detection device 20 indicate that a user has pressed pushbutton 23, processor 204 causes communications circuitry 198 to dial the phone number associated with the currently highlighted menu item. In one embodiment, the speed of movement of highlight bar 16 or other screen pointer is programmable by a user.

Processor 204 also transmits indicator light control signals to motion detection device 20 via I/O interface 202. The indicator light control signals control the lighting of indicator ring 21 and pushbutton 23 to provide various notifications to the user.

In one form of the present invention, a user may enter free hand drawings into portable electronic device 10 by moving finger 22 against motion detection device 20. Entered drawings may be used to annotate or create facsimile documents, or may represent user signatures that may be used to verify electronic transactions. In addition, character recognition software may be used to recognize alphanumeric character symbols entered by a user by moving finger 22 against motion detection device 20.

It will be understood by a person of ordinary skill in the art that functions performed by portable electronic device 10 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An apparatus for controlling the position of a screen pointer for an electronic device having a display screen, the apparatus comprising:

a pushbutton for selecting an item displayed on the display screen, the pushbutton including an imaging surface against which a portion of the tip of a human digit may be placed;

a light source for illuminating that portion of the tip of the digit that is placed against the imaging surface, thereby generating reflected images;

a motion transducer;

a lens for receiving the reflected images and directing the reflected images onto the motion transducer, the motion transducer generating digital representations of the reflected images, the motion transducer generating a first set of movement data based on the digital representations of the reflected images, the first set of movement data indicative of motion of the tip of the digit across the imaging surface; and a frame for housing the light source, the motion transducer, and the lens, and wherein the pushbutton is moveably positioned over a top surface of the frame.

2. The apparatus of claim 1, wherein the apparatus is configured to emit visible light through the pushbutton.

3. The apparatus of claim 2, wherein the apparatus is configured to emit visible light through the pushbutton when the pushbutton is touched.

4. The apparatus of claim 2, wherein the apparatus is configured to emit visible light through the pushbutton to provide a notification to the user.

5. The apparatus of claim 2, wherein the apparatus is configured to emit visible light through the pushbutton in short bursts, thereby causing the pushbutton to appear to blink.

6. The apparatus of claim 2, wherein the apparatus is configured to emit visible light in multiple colors through the pushbutton.

7. The apparatus of claim 6, wherein each color of visible light emitted through the pushbutton corresponds to a type of notification.

8. The apparatus of claim 1, and further comprising an indicator device substantially surrounding the pushbutton for providing a notification.

9. The apparatus of claim 8, wherein the indicator device is configured to emit visible light.

10. The apparatus of claim 9, wherein the indicator device is configured to emit visible light in short bursts, thereby appearing to blink.

11. The apparatus of claim 9, wherein the indicator device is configured to emit visible light in multiple colors.

12. The apparatus of claim 11, wherein each color of visible light emitted by the indicator device corresponds to a type of notification.

13. A method of controlling the position of a screen pointer for an electronic device having a display screen, the method comprising:

providing a pushbutton for selecting an item displayed on the display screen;

placing a portion of an appendage of the human hand against the pushbutton;

illuminating a portion of the appendage that is against the pushbutton;

focusing images reflected from the portion of the appendage onto an array of photo detectors;

digitizing output values of the photo detectors, thereby generating digital representations of the reflected images;

correlating at least one version of a first one of the digital representations with at least one version of a second one of the digital representations to generate a first set of motion data indicative of motion in orthogonal axes across the pushbutton by the appendage;

adjusting the position of the screen pointer in accordance with the first set of motion data;

generating a second set of motion data indicative of motion in orthogonal axes across the pushbutton by the appendage; and displaying information on the display screen corresponding to the second set of motion data, wherein the information displayed on the display screen corresponding to the second set of motion data is an alphanumeric character.

\* \* \* \* \*